United States Patent [19]

Oshima

[11] 4,051,744
[45] Oct. 4, 1977

[54] GEAR MECHANISM FOR PREVENTING REVERSE ROTATION

[75] Inventor: Kenji Oshima, Tokyo, Japan

[73] Assignee: Kabushiki Kaisha Seikosha, Japan

[21] Appl. No.: 732,720

[22] Filed: Oct. 15, 1976

[51] Int. Cl.² .................... F16H 55/04; F16H 55/06
[52] U.S. Cl. .......................................... 74/437; 74/462
[58] Field of Search ................. 74/462, 460, 457, 437

[56] References Cited

U.S. PATENT DOCUMENTS

| | | | |
|---|---|---|---|
| 462,073 | 10/1891 | Beauregard | 74/462 X |
| 2,788,567 | 4/1957 | Stibitz | 74/437 X |
| 3,851,540 | 12/1974 | Tutiya | 74/462 X |

Primary Examiner—Leonard H. Gerin
Attorney, Agent, or Firm—Robert E. Burns; Emmanuel J. Lobato; Bruce L. Adams

[57] ABSTRACT

A drive pinion is provided with wide teeth and narrow teeth. A follower wheel is provided with teeth which have cut-away portions at their front sides. When the drive pinion rotates in reverse direction, one wide tooth makes contact with an apex of a tooth of the follower gear wheel thereby preventing the reverse rotation of the drive pinion.

1 Claim, 3 Drawing Figures

GEAR MECHANISM FOR PREVENTING REVERSE ROTATION

BACKGROUND OF THE INVENTION

The present invention relates to a gear mechanism in a timepiece for preventing reverse rotation of a gear wheel.

In commonly used conventional means for prevention of reverse rotation of a gear wheel, a spring piece is provided for elastically contacting a gear wheel. In other conventional mechanisms, teeth of two gear wheels are shaped into special forms so that the gear wheels may bite each other when they turn in reverse direction. However, the latter gear mechanisms for preventing reverse rotation are defective in that it is very difficult to manufacture the gears since the teeth of the driving gear and the follower gear should be formed precisely. Moreover the distance between two gear shafts should be set accurately. The gear mechanism has further defects in that when the gear wheels bite each other, preventing reverse rotation, normal rotation starts require additional forces for releasing the bite state. As described above, the conventional gear mechanism requires accuracy in manufacturing, and has little practical effect considering the high cost of manufacturing.

SUMMARY OF THE INVENTION

The present invention intends to eliminate the defects in the conventional gear mechanism for preventing reverse rotation.

According to a feature of the present invention there is provided a gear mechanism for preventing reverse rotation comprising a drive pinion with wide teeth and narrow teeth alternately leaving more interdental spaces in front of the wide teeth than at the back, and a follower gear wheel provided with teeth formed with cut-away portions at the front sides.

One object of the present invention is to provide a gear mechanism which performs normal rotation and the prevention of reverse rotation smoothly even if tooth forms of two engaged gears are not so accurately designed.

BRIEF DESCRIPTION OF THE DRAWINGS

The above object, and other objects and characteristic features of the present invention will become evident and will be more readily understood from the following description and claims taken in conjunction with the accompanying drawings in which.

DESCRIPTION OF A PREFERRED EMBODIMENT

In the present embodiment every tooth of the gear wheels are fundamentally formed into involute tooth forms.

Figure 2:
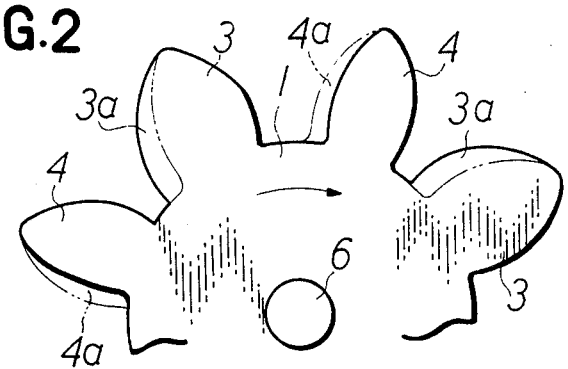
FIG. 2 is plan view of a part of a drive pinion.

A drive pinion 1 is rotated continuously or intermittently in a clockwise direction by a motor or other driving means, and engages with a follower gear wheel 2. The drive pinion 1 is provided with two kinds of teeth 3, 4 of different forms alternately. As shown in FIG. 2, one wide tooth 3 is formed with a enlarged portion 3a having a smooth curved surface at its rear side. The other narrow tooth 4 between the teeth 3, 3 is provided with a cut-away portion 4a having a smooth curved surface at its rear side. In the present case, the enlarged portion 3a and the cut-away portion 4a are almost equal. But they may not necessarily be equal.

Figure 1:
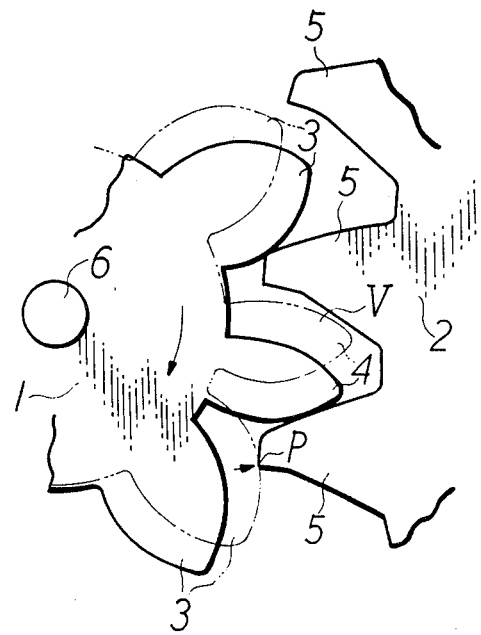
FIG. 1 is a plan view, partly broken away, of an embodiment of the present invention.
Figure 3:
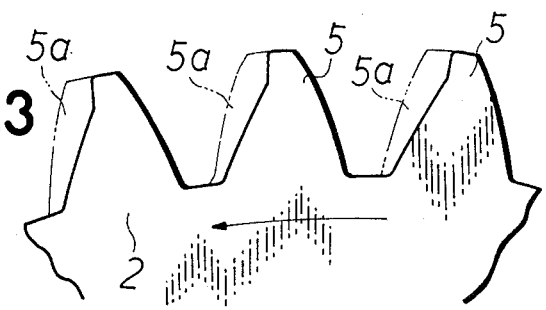
FIG. 3 is a plan view of a part of a follower gear wheel.

As shown in FIG. 3, the follower gear wheel 2 is provided with teeth 5. Every tooth 5 is provided with cut-away portions 5a in the front side, and the back side is formed involute to engage with the teeth 3 and 4 smoothly. The drive pinion 1 meshes the follower gear wheel 2, and rotates in clockwise direction as shown in FIG. 1. Reference numeral 6 designates a shaft of the drive pinion.

Operationally, as the drive pinion 1 rotates in clockwise direction by means of motor or other drive means, it rotates the follower gear wheel 2 in counter-clockwise direction with its teeth 3, 4 engaging the teeth 5 in involute relation. This engaged mechanism is the same as that of common gear train operations.

When an external force is applied to the drive pinion 1 to rotate it in the reverse direction, the drive pinion and the follower gear wheels 2 operate as follows.

At the beginning of the reverse rotation, a wide gap V is spread between the back side surface of the tooth 4 of the drive pinion 1 and the tooth 5 of the follower gear wheel 2. Therefore even if the drive pinion 1 rotates in reverse direction, the tooth 4 moves in the gap V and gives no movement to the follower gear wheel 2 as shown in phantom line in FIG. 1. Whereupon the tooth 3 of the drive gear comes in contact with the follower gear wheel at an apex P, and applies pressure to the follower gear wheel in the diametal direction thereby preventing reverse rotation.

When normal rotational forces are again applied to the drive pinion 1, the tooth 3 contacting the tooth 5 at the apex P leaves from it without any load, and applies rotational forces to the follower gear wheel to rotate it in the normal direction.

What is claimed is:

1. A gear mechanism for preventing reverse rotation comprising:
   a drive pinion having alternately disposed wide teeth and narrow teeth and having larger interdental spaces in front of the wide teeth than at the back thereof,
   and a follower gear wheel having teeth formed with cut-away portions at their front sides.

* * * * *